United States Patent [19]

Quinn

[11] 4,390,277

[45] Jun. 28, 1983

[54] FLAT SHEET SCATTEROMETER

[75] Inventor: Bernard W. Quinn, Rancho Palos Verdes, Calif.

[73] Assignee: McDonnell Douglas Corporation, Long Beach, Calif.

[21] Appl. No.: 174,194

[22] Filed: Jul. 31, 1980

[51] Int. Cl.³ ............................................. G01B 11/30
[52] U.S. Cl. ..................................... 356/371; 356/345
[58] Field of Search ............... 356/338, 341, 342, 343, 356/371, 445, 446, 448, 431, 444; 350/6.5

[56] References Cited

U.S. PATENT DOCUMENTS

| | | | |
|---|---|---|---|
| 3,229,564 | 1/1966 | Meltzer | 356/448 |
| 3,565,568 | 2/1971 | Hock | 356/448 |
| 3,715,165 | 2/1973 | Smith | 356/371 |
| 3,782,827 | 1/1974 | Nisenson et al. | 356/237 |
| 3,784,309 | 1/1974 | Brelot et al. | 356/448 |
| 3,815,998 | 10/1972 | Tietze | 250/562 |
| 3,836,787 | 9/1974 | Ash | 250/572 |
| 3,871,771 | 3/1975 | Scott | 356/138 |
| 3,885,875 | 5/1975 | Rosenfeld et al. | 356/4 |
| 3,922,093 | 11/1975 | Dandliker et al. | 356/371 |
| 3,925,785 | 12/1975 | Firtion et al. | 350/6.5 |
| 3,971,956 | 7/1976 | Jakeman et al. | 356/371 |
| 4,070,113 | 1/1978 | Frazer et al. | 356/343 |
| 4,072,426 | 2/1978 | Horn | 356/446 |
| 4,289,400 | 9/1981 | Kubota et al. | 356/371 |

*Primary Examiner*—R. A. Rosenberger
*Attorney, Agent, or Firm*—Henry M. Bissell

[57] ABSTRACT

A scatterometer for determining root mean square (RMS) scattering of light from reflective surfaces using monochromatic light which is generated by a source, expanded, collimated into a sampling beam, directed to a movable reflective surface which directs the light to the surface to be tested at a nominally normal incidence angle. The reflected light varies from the normal incidence angle by an amount determined by the slope of the surface being tested. The modified reflected beam is then passed through the collimating lens and reflected to a beam splitter for determination of the thus measured slope. The components of the light are measured by annular concentric sensors, with the amount of light received by the outer sensors being a reflection of the amount of slope on the surface of the plane tested. Also, a second beam splitter and detector combine to provide both corrections for the system and measurement of small slope angle variations in the surface being tested.

25 Claims, 7 Drawing Figures

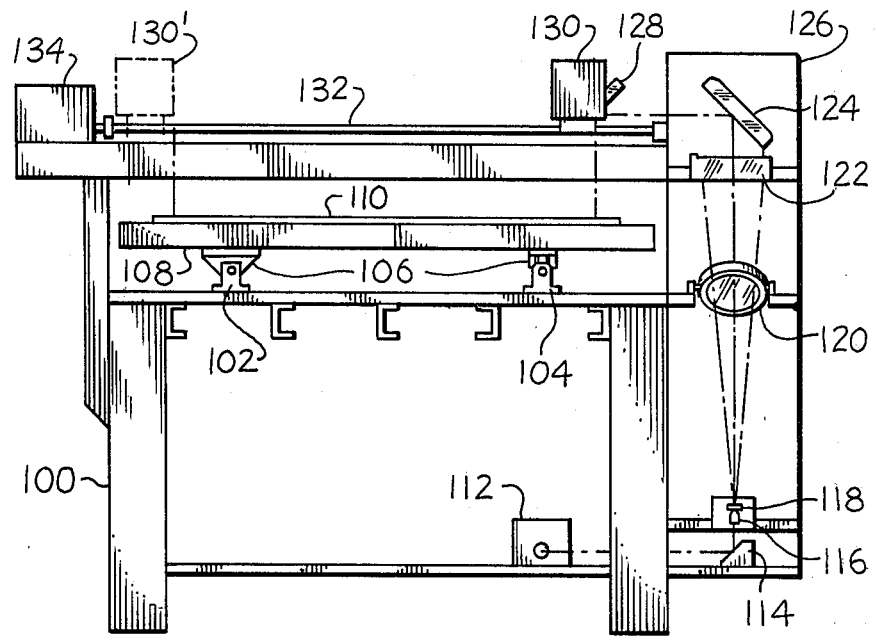
FIG_4
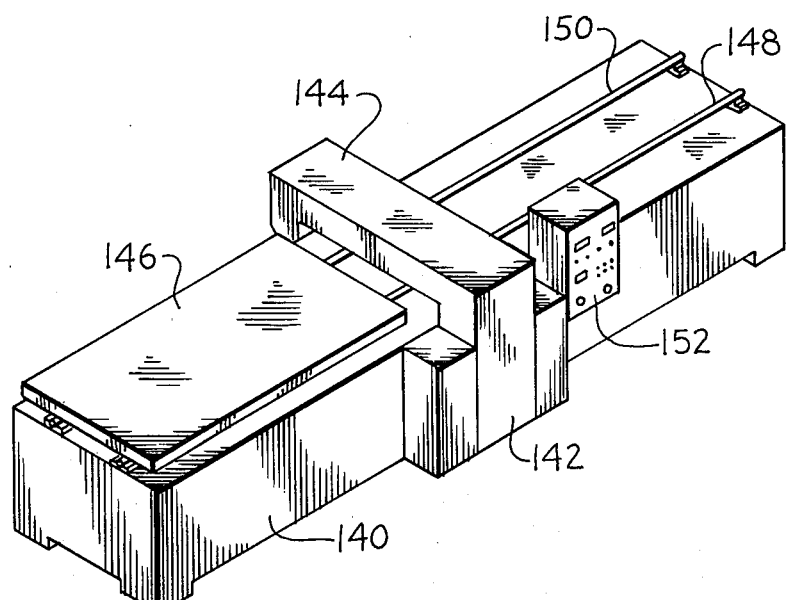
FIG_5

FLAT SHEET SCATTEROMETER

BACKGROUND OF THE INVENTION

1. Field of the Invention

The present invention is directed to apparatus for testing planar reflective surfaces to determine the effective reflection capabilities thereof. More particularly, the present invention is directed to an apparatus for testing glass sheet used in very sensitive reflective surfaces to determine the flatness of the sheet and thus the reflective capabilities of the glass after silvering.

2. Description of the Prior Art

The use of optical signals to test numerous types of surfaces for roughness, or to otherwise determine surface characteristics, is a rapidly advancing art. The development of lasers, beam splitters, and dichroic mirrors makes it possible to utilize the reflective characteristics of the surface in order to determine the surface's own characteristics. If light is projected toward a flat reflective surface, normal thereto, the surface will reflect the light directly back to the source. However, any variations in the surface causing in incident angle other than 90° results in the light being reflected away from the source. Using these basic principles, numerous systems have been suggested for determining surface characteristics.

U.S. Pat. No. 3,871,771 of Scott discloses a measuring system which utilizes polarized light from a laser and a beam splitter. The system measures roughness to a certain extent, but does not measure root mean square (RMS) variations in the suface characteristics. Jakeman et al in patent 3,971,956 measure the root mean square roughness of a surface by utilizing a laser. However, Jakeman et al direct the laser towards the surface, normal thereto, and then utilize two separated detectors at angles other than perpendicular to the suface to determine the RMS variations in the surface.

Ash in U.S. Pat. No. 3,836,787 suggest another system for measuring roughness. The reference utilizes an aperture that is smaller than the wavelength of the light which is generated at an angle normal to the surface of the object and oscillates the object behind the aperture to produce a modulated output signal. Variations in the modulated signal are then used to measure surface roughness.

U.S. Pat. No. 3,815,998 of Tietze utilizes collimated light directed normal to the surface being tested and captures the scattered reflected light with a lens. A knife edge at the focal point of the lens removes 50% of the scattered angles and the remaining light is allowed to be incident to a screen. The result is a contrast image formed on the screen. The system is very sensitive to slopes lying parallel to the knife edge, but is almost totally insensitive to slopes perpendicular to the knife edge.

U.S. Pat. No. 3,782,827 of Nisenson et al utilizes an analog system for collecting its data. A photometer is used behind an aperture for measuring the intensity of the reflected and scattered light. Nisenson rotates the sample to record the intensity as a function of rotation angle. Thus the system requires considerable work in order to measure the scatter characteristics and the physical structure results in a very small bandwidth.

In Smith U.S. Pat. No. 3,715,165 the specimen surface is investigated using a pencil of light which is brought to a point focus and oscillated longitudinally along the surface. Thus the reflected light varies in intensity at a downstream pinhole due to variations in the distance between the focus point and the surface. This intensity variation is used to produce a voltage which is recorded to determine the surface profile.

Rosenfeld et al in U.S. Pat. No. 3,885,875 generate a laser signal, pass the signal through a lens and reflect it off of a rotating surface. The reflected signal passes back through the lens and to the test article where it is reflected through the lens again, reversing its characteristics. Next, the signal is finally reflected by a beam splitter to a photosensitive element. The system does not use collimated light and it measures the characteristics against an artificial surface or profile. Rosenfeld et al further disclose various other known systems, and discuss the problems inherent in such systems.

Lastly, numerous other systems have been suggested in the prior art. Equipment has been designed to determine the surface characteristics of the test item in many ways, for example, U.S. Pat. No. 4,115,005 to Murata uses two converging light sources; U.S. Pat. No. 4,017,188 to Sawatari utilizes splitting of light and slits; and U.S. Pat. No. 3,998,553 of Hunter et al utilizes a spherical wavefront. Baker et al in U.S. Pat. No. 3,892,494 detects scratches on a surface by variations in intensity of the reflected focused light beam. Also, the art discloses the testing of different materials, for example, see U.S. Pat. No. 3,602,596 of Asthelmer et al (testing bearing races) and U.S. Pat. No. 3,734,626 of Roberts et al (testing magnetic discs).

SUMMARY OF THE INVENTION

The apparatus of the present invention is used for testing and determining root mean square (RMS) variations in the specularity of a large flat sheet of reflective material. The system is especially useful in determining the surface characteristics of lites used in producing heliostats for solar collector units. The lites are sheets of low cost flat float glass which are typically 4 feet wide, 11 feet long and only ⅛ of an inch thick. The apparatus of the present invention is adapted to test these units both prior to and after silvering. Thus the unit initially determines whether a lite may be sufficiently flat to use in a heliostat and then tests the lite after silvering to determine whether it is within tolerance and also to ascertain optimum orientation for use of the lite. The unsilvered units are tested on the scatterometer of the present invention by placing them on a black velvet sheet. The velvet nap provides a conformal support for the glass sheet, allowing it to assume a mean flat plane. Further, small dirt particles falling on the nap will bury in the nap without disturbing the flat plane of support. The testing laser beam is reflected from both surfaces of the sheet in the same manner as are solar rays. After silvering, the testing is effected in the same manner. However, the reflectivity of the second surface is about 90%, whereas before silvering it was about 4%.

The flat sheet lites as used in the heliostats are second surface mirrors. Sunlight incident and reflected from the lite is affected in reflection from the first surface by the slope variations. The ray paths are also deviated by the refractive properties of the lite's thickness variations and lastly by the slope variations of the silvered second surface. The scatterometer makes no attempt to discriminate among these scattering operators, but measures the scattering resulting from all the lite's imperfections. Thus the true specular properties of the lite in directing a patch of solar radiation on a boiler or other solar collector can be determined without actually installing the lite in a finished heliostat in a solar power central tower configuration.

In the scatterometer, a laser, such as a helium/neon laser, is used to generate an output beam which is spatially filtered, expanded and collimated into a 2 inch diameter sampling beam. The resulting planar wavefronts are directed by a 45° mirror to normal incidence on a linear translation table. The lite on the table, of course, is appropriately centered and leveled prior to use. The table is also provided with means to move the lite along the table so that a continuous read-out of the RMS scattering of each sample taken may be obtained.

The wavefronts returning from the lite carry the scattering information by virtue of the variations in the angle of reflection of the collimated beam. The reflected beam is then passed back through the collimating lens, which then functions as a focusing or decollimating lens into a first beam splitter which is provided with two degrees of rotation.

The beam splitter is positioned at a 45° angle to the axis of the reflected light so that the returned signal is reflected toward, for example, a rotating mirror with an open sector which alternately reflects a portion of the returned signal to a pattern centroid detector. The signal generated by the centroid detector is utilized to rotate the first beam splitter about its two axes in order to center the signal received from the lite and, thus, to insure appropriate control over the system. The pattern detector is also used to determine the optimum orientation of the lite, i.e. the minimum RMS scattering value for the whole lite.

The rotating mirror beam splitter is provided with a cut-out section in order to allow a portion of the returned signal to pass to a pattern-sampling detector. The pattern-sampling detector and the centroid detector are at the focal point of the light passing through the decollimating lens. This focal point is, due to the optics of the system, also the focal point for the laser beam at the beam expander previously described.

The pattern-sampling detector is formed of a number of concentric rings of sensors, and a central solid sensor. When the unit is operated, the light produced by the laser which is incident upon the surface of the lite is reflected back to the pattern-sampling detector in a manner indicative of aberrations in the surface of the lite. That is, when the incident light is normal to the surface of a perfect lite it is reflected back through the system and reaches the pattern-sampling detector at the solid central sensor, since the central sensor is at the focal point of the decollimating lens. Alternatively, should the original light beam strike the surface of the lite in a direction other than normal to the surface due to slope variations or aberrations in the lite surface, it will be deflected out of its normal position in the collimated beam and thus, when it reaches the focal point via the decollimating lens and the beam splitters, will be incident upon the pattern-sampling detector at a point away from the solid center sensor of the detector. In this manner, the intensity of the light in each of the concentric rings sensed by the pattern-sampling detector can be used to determine the RMS scatter at a given point in the lite. Thus, by using the position signal generated by the centroid detector and the RMS variation signal generated by the pattern sampling detector and by comparing and collating the results of the two signals, optimum position and orientation of the lite can be determined.

By utilizing this apparatus, then, both an unsilvered lite and a silvered reflective lite can be tested to determine whether they perform effectively and to determine the most advantageous position for the lite when used in, for example, solar-collecting structures.

BRIEF DESCRIPTION OF THE DRAWINGS

A better understanding of the present invention may be had from a consideration of the following detailed description, taken in conjunction with the accompanying drawings in which:

FIG. 4 shows an end view of the overall apparatus incorporating the invention; and FIG. 5 is an isometric view of the apparatus of FIG. 4.

DESCRIPTION OF THE PREFERRED EMBODIMENTS

Figure 1:
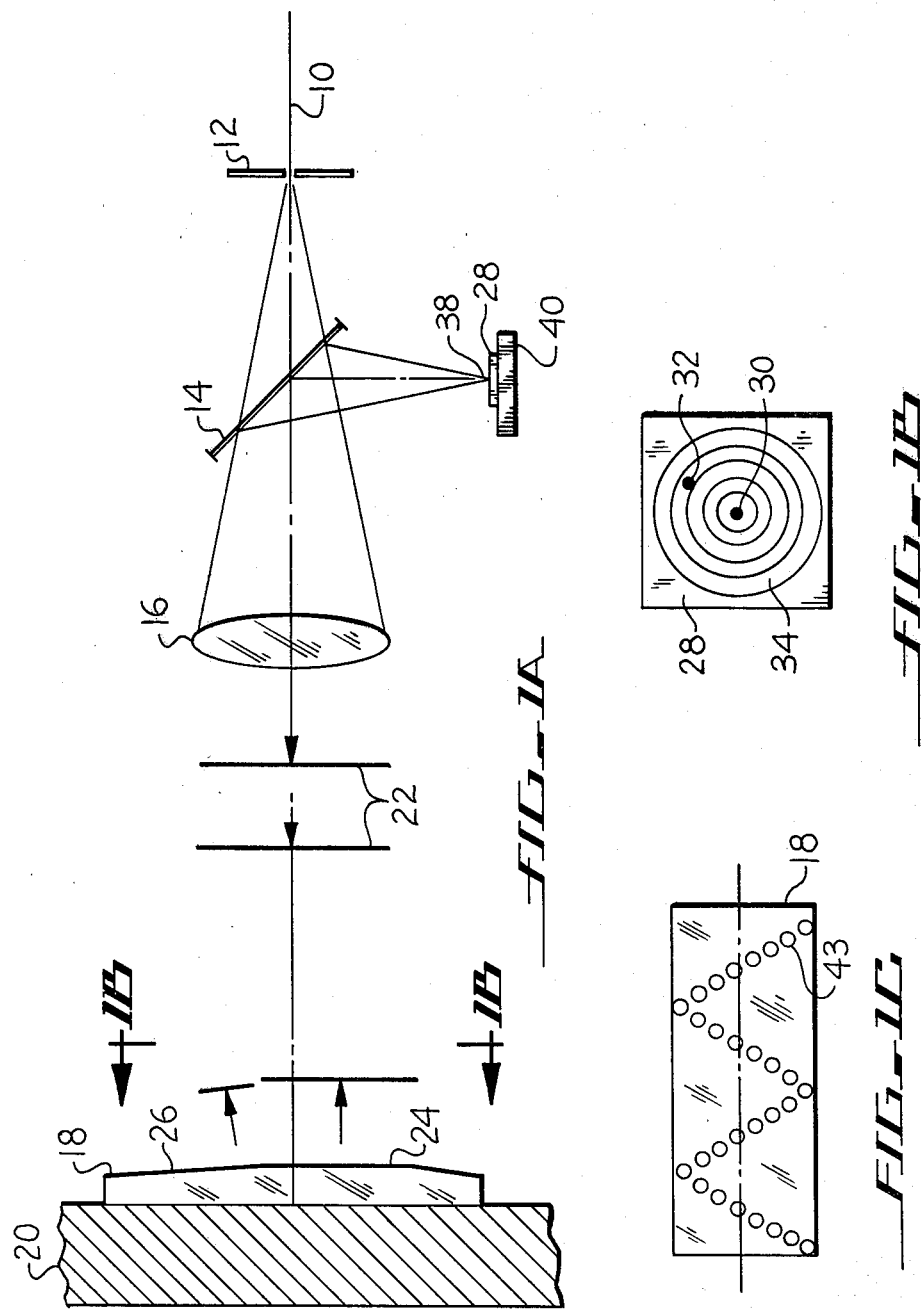
FIG. 1A is a schematic representation of the optical system involved in the present invention.
FIG. 1B is a stylized representation of the images obtained along section 1B—1B of FIG. 1.
FIG. 1C is a schematic representation of the sampling pattern of the present invention.

As best shown in FIG. 1A monochromatic light generated, for example, by a HeNe laser passes through a focusing lens and pin hole 12 to form an expanding directional beam. The beam then passes through first dichroic mirror 14 and is incident on collimating lens 16. The collimated light beam thus takes the form of planar wavefronts 22 passing toward lite 18 which is positioned on backing 20. In FIG. 1A as shown, lite 18 has two distinct surface slopes 24 and 26. Planar light waves 22 are incident upon, and normal to, planar surface 24 and thus are reflected directly back to collimating lens, decollimated and reflected by beam splitter 14 to detector 28 mounted on surface 40. Light incident on planar surface 26 is not reflected directly back, since planar surface 26 is not normal to the direction of travel of the wavefront. As a result, when light reflected by surface 26 reaches collimating lens 16, it is travelling in a direction other than parallel to the axis shown in the figure and is focused on a different point than light that strikes planar surface 24 normal thereto. The focal distance of the system is from lens 16 to the beam generating lens positioned adjacent pin hole 12. This distance is also the distance reflected light travels to reach point 38, the center surface of pattern-sampling detector 28. Thus, the light from sloped surface 26 strikes detector 28 at a point other than at the center thereof, and the amount of light deflection measured radially from the focal point at the detector is a measure of the slope of the lite surface that is not normal to the wavefront direction of travel. Defining r as the distance off-axis and f as the focal length of the lens, the scatter angle (a) is given by: $a = \arctan r/f$. The slope angle (B) of the surface segment can then be defined as: $B = a/2$.

All of the surface slope angles of the same degree, but in randomly different orientations, will be focused as light spots on the focal plane of the detector at the same radial distance and thus form a ring of light. Therefore, by using a ring or annulus detector, i.e. by using a detector with a plurality of separate discrete interrelated rings of detectors, the light power can be summed. By summing all of the light power in the scatter pattern at the focal plane, the percentage of the slope angle occurrence of all slope angles can be determined. Thus, by using a number of discrete concentric ring detectors in the focal plane, the central detector being at the focal point, the frequency distribution of the slope angles in the surface can be approximated and the RMS variations can be computed. In this manner, the scatter pattern of the light in a focal plane is a three-dimensional plot of the lite's slope variations in degree, orientation and frequency of occurrence.

Referring to FIG. 1B, a stylized version of the pattern discussed above is depicted, showing pattern sampling detector 28 having plural concentric ring detectors 30 and 34. Pattern sampling detector 28 would be positioned remote from the section lines of FIG. 1A, see FIG. 2 for example, but for illustration here it is shown as if all of the intermediate steps have been effected. Thus, detector 30 is solid and centered in such a manner that it is, during operation, the focal point of the light while the remaining detectors, e.g. ring 34, are annular. Spot 32 shown in one of the rings is indicative of the amount of slope, and direction of slope of surface 26 on lite 18 of FIG. 1A.

During operation, the apparatus of the present invention allows for continuous movement of the collimated light beam across the lite, and moves the lite perpendicular to the collimated beam travel such that the traverse path shown in FIG. 1C is produced. In the figure, lite 18 has its reflective characteristics sampled at points 43 which form a zigzag pattern along the lite. The depicted zigzag pattern is exaggerated for effect. In the preferred form, the lite would move in the traverse direction a distance of only about two inches during each pass of the collimated light beam across the lite. Also, sampling, as shall be later described, is effected at various points, and not continuously over the width of the lite so that independent readings may be obtained, and so that the secondary overall characteristics of the lite may be obtained in order to align the lite at the maximum reflective orientation during final production.

Figure 2:
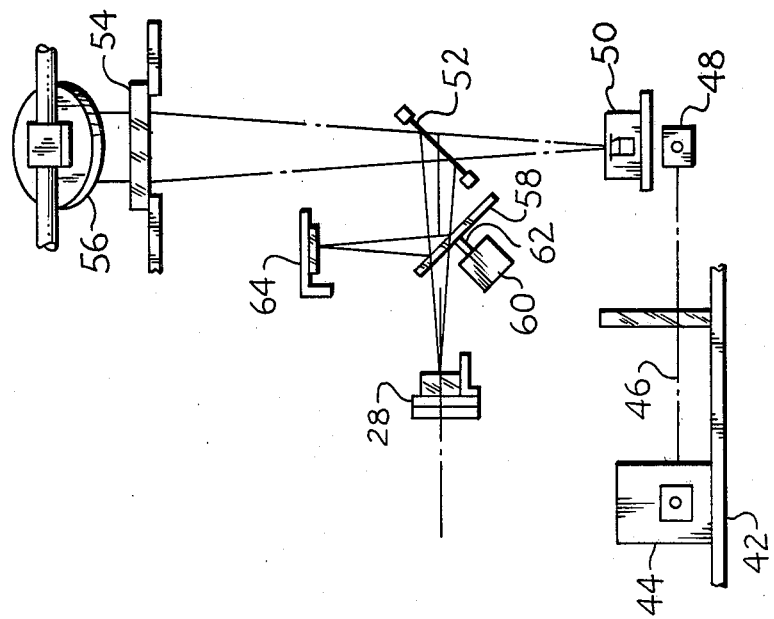
FIG. 2 shows the light-reflecting apparatus of the invention.
Figure 3:
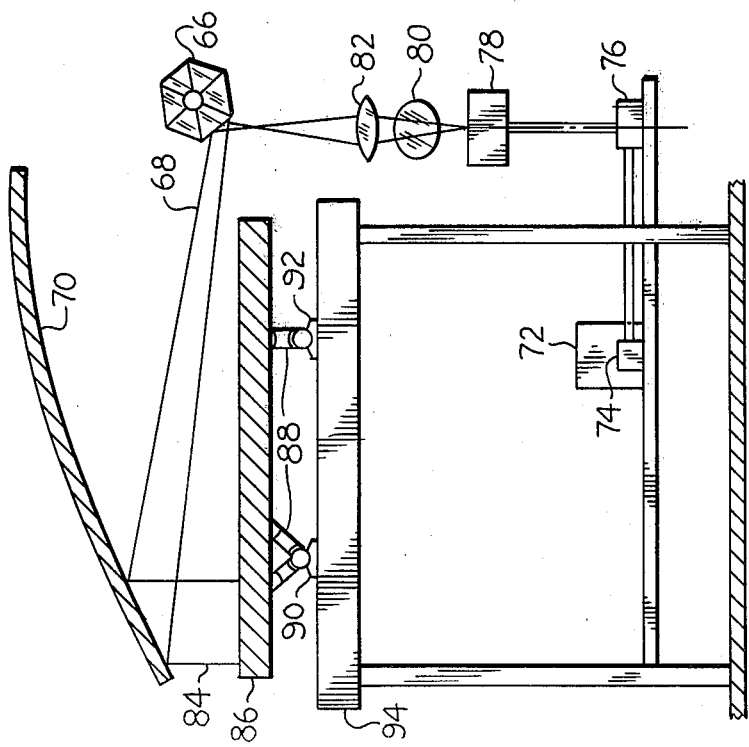
FIG. 3 shows an alternate embodiment of the present invention.

FIGS. 2 and 3 show two alternative embodiments of the apparatus of the present invention. In FIG. 2 laser 44, mounted on table 42, generates a monochromatic light signal 46 which is directed to mirror 48 for reflection to beam expander and pin hole 50. The pin hole and the beam expander normally are constituted by a pin hole and a lens which produce a light signal having a diameter approximately equal to the diameter of collimating lens 54 when the signal reaches the collimating lens. The collimated light exits lens 54 and is reflected by mirror 56, which is positioned at an angle of 45°, toward a second mirror 128 (shown in FIG. 4) and thence to the lite, back to mirror 56 and to lens 54 where it is decollimated. The thus decollimated light is then incident upon beam splitter mirror 52 which is rotatable in two planes. Beam splitter mirror 52 thus reflects the light beam incident upon it toward beam splitter 58 which, in the preferred form, is a rotating segmented mirror driven by shaft 62 mounted to motor 60. The segmented mirror preferably has a 60° angle cut-out and is rotated at a speed of 2 revolutions per second. In this manner, during the time that the section of the mirror which is cut out passes through the area of the light beam, the light beam continues in a straight path toward pattern-sampling detector 28. Detector 28 is annular in character, as described above, and thus senses the relative amount of light incident upon the various surfaces of the lite which are normal to the direction of light travel, as well as that of different incidence angles. During the remaining 300° rotation of beam-splitting mirror 58, the light is reflected to second, non-annular, sampling detector 64. This four quadrant detector is mainly used to sense the centroid of the sampling pattern position resulting from the overall relative centering of rotatable reflective beam splitter mirror 52. It is coupled, either mechanically or otherwise, to means for rotating mirror 52 about its two axes of rotation and centering the beam centroid on annular sampling detector 28. Both detectors, of course, are positioned at the focal plane of the reflected light.

In this embodiment, the laser beam is generated and directed through the pin hole, the expander and the collimating lens. The collimated beam is then directed by the fixed 45° mirror to a 45° scanning mirror (not shown). The scanning mirror is mounted on a linearly translatable carriage, as better shown in FIG. 5, which in turn is supported by the scanning bridge. (See FIG. 4.) The collimated beam is directed at normal incidence to the lite and may be placed at any lateral position. The lite is mounted on the linearly translatable table which is orthogonal to the scanning mirror direction. (See FIG. 2.) This allows the sampling area of the collimated beam to sweep out the entire surface of a large glass lite, as described with reference to FIG. 1C above. The reflected wavefronts with slope information (as described with reference to FIGS. 1A and 1B) are directed by the first beam splitter 52 to the concentric ring detector 28. The beam splitter 52 is motorized and can be rotated in two directions. Following the beam splitter is a rotatable mirror 58. When the mirror is rotated into the returning beam path, the scatter pattern is focused alternately on the centroid detector 64 and sampling detector 28. Error signals corresponding to off-center positioning on the centroid detector 64 cause the system to operate the positioning motors (not shown) on first beam splitter 52 and adjust its angular position and keep the scatter pattern centered on the centroid detector. The center of the scatter pattern-sampling (annular) detector 28 is pre-aligned with the centroid detector center. When a scatter pattern is being measured, i.e. when the rotating mirror is not reflecting the signal to the centroid detector, the coordinate origin is always the center of the pattern. For a planar lite, the centroid of the collimated light (normal incidence) defines the lite's perpendicular and is focused on the center of the pattern-sampling detector 28. When a scatter pattern sample is collected, the data provided by the reflection of the light from the surface of the lite during the appropriate time period provides data on all the slopes of the lite surface in the sample illuminated, while the centroid detector provides data on the slowly varying slopes of the lite.

Two stages of heliostat panel construction are relevant to the apparatus of the present invention. At first, the flexible, usually ⅛ inch thick, lite is not backed by its final urethane panel. Thus the lite surface will generally conform to the flatness of the support tables shown in FIG. 5. For example, a height change of 0.005 inches over a distance of 5.00 inches due to the conformance of the flexible lite to the table will result in a slope of 1 MRAD. This is about the acceptable level of RMS slope error for a high-quality heliostat panel. To avoid the cost and complication of a vacuum platen in order to overcome the above curvatures, the table top can be covered with, for example, a short nap black velvet cloth or other soft light absorptive material. In this manner the lite will float on the nap and assume a mean free position. The reflections off the table top through the unsilvered light will be suppressed, and the exposed surface reflections will be more accurately read. Also, the lite will not be scratched at its interface with the table when it is loaded on a velvet cloth, in view of the softness of the cloth.

Data processing of the signals received by the detectors and the sequential mechanical movements of the rotating mirror and the dichroic beam splitter are preferably computer controlled. The computer processes the data to determine several parameters. The mean plane of best fit must be determined for the unmounted lite, using the centroid data and adjusting the individual RMS values for all samples into the mean best fit plane to determine the final overall RMS value. For the mounted lite, the mean surface of best fit will be determined by the individual sample RMS values being adjusted to the mean plane of best fit. Thus, the mean curvature of the panel and the RMS curvature error will be determined. By weighting a sample's centroid peak power value by the RMS of the scatter angle, a comparison can be made along all samples to identify major reflectivity defects in a lite and compare relative means reflectivity values between different lites.

In the alternative embodiment shown in FIG. 3, 45° mirror 56 of FIG. 2 is replaced by rotating faceted rotor 66 which is used to direct expanding light beam 68 across a segment of off-axis replicated parabolic mirror 70. The light is produced by laser 72, reflected by mirrors 74 and 76 to pinhole 78 and then passed through dichroic mirror 80, which is equivalent to mirror 52 in FIG. 2. It is focused by lens 82 at a focal length less than the distance between lens 82 and faceted rotor 66.

The focal point of the expanding beam is maintained at the focal point of the paraboloid and thus the parabolic mirror produces a collimated light beam 88 incident normal to lite 86. The lite is supported by carriages 88 on tracks 90 and 92, which are adjustable to position the lite on stand 94. This embodiment has greater speed potential than the embodiment of FIG. 2, and is less susceptible to vibration. The basic limitation on the speed of scanning is the inertia of the beam splitter rotators.

In FIG. 4, an end view of the apparatus schematically shown in FIG. 2 is depicted. In FIG. 4 support table 108 having lite 110 placed thereon is provided with tracks 102 and 104 which adjustably support it, through brackets 106, on table 100. Monochromatic light for testing the lite is generated by laser 112 and reflected vertically by mirror 114 through pinhole 116 and lens 118 to movable dichroic mirror 120. The expanding light beam passes through mirror 120 and is collimated by collimating lens 122 before being reflected by 45° mirror 124. This portion of the unit is contained in housing 126. The light beam, reflected by 45° mirror 124, is reflected toward lite 110 by 45° mirror 128 which is positioned in laterally movable housing 130. Housing 130 is positioned on track 132, which may be a rotating screw operated by drive means 134. Housing 130 containing mirror 128 is laterally moved across the table to the position shown by 130' in order to scan the whole width of lite 110. The beam reflected from lite 110 impinges on mirror 128, is directed to 45° mirror 124 and is then utilized as previously described with regard to FIG. 2.

In FIG. 5, an overall isometric view of the unit of the present invention is shown. The unit table 140 is provided with housing 142 for the light beam production and reflection system and includes cross member 144 used for encasing reflective mirror 128 and housing 130 as well as moving them across the table. Lite table 146 is provided on stand 140 and supported on tracks 148 and 150. One of the tracks is provided with an adjustable mounting means, not shown, in order to allow for a close approximation of normal light incidence prior to operation of the unit. Control box 152 contains the electronic circuitry necessary to operate the unit of the present invention. Normally, a screw drive, not shown, would be positioned underneath support surface 146 to move support surface 146 along tracks 148 and 150 so that continuous sampling may be effected.

In another alternative embodiment, the centroid adjuster and the beam splitter rotators are not necessary. In this form, the invention utilizes a large area array type of detector in the place of the annular detectors. The principal disadvantage of these types of large array detectors are that their dynamic ranges are often limited to a ratio of about 500:1. Also, charge spilling into adjacent elements results from the high photon fluxes affecting the array and thus the linearity of the output is affected. The annulus detector described above, on the other hand, has a dynamic range of about $75 \times 10^6:1$ with a maximum irradiance before saturation of 30 watts per square cm at 632.8 mm. Thus, the preferred form of the invention is the annulus detector form.

Although there have been described above specific arrangements of a flat sheet scatterometer for solar panels and heliostats in accordance with the invention for the purpose of illustrating the manner in which the invention may be used to advantage, it will be appreciated that the invention is not limited thereto. For example, although the invention has been disclosed in the context of association with a large thin flat sheet of float glass, the principles of the invention are equally applicable to other mirrored types of glass or reflective surfaces. Accordingly, any and all modifications, variations or equivalent arrangements which may occur to those skilled in the art should be considered to be within the scope of the invention as defined by the appended claims.

What is claimed is:

1. A flat sheet scatterometer for determining surface variations of a planar surface comprising:
    a monochromatic light source;
    light controlling and directing means adapted to control and direct light produced by said source;
    light collimating means adapted to receive light from said controlling means;
    light directing means adapted to receive light from said collimating means, direct said light to an object, receive light reflected by said object and reflect it back to said collimating means;
    a beam splitter adapted to receive said reflected light from said collimating means and separate said light from non-reflected light, said beam splitter being rotatable about two axes;
    coplanar light sensing means positioned at the focal plane of the reflected light exiting said collimating means and adapted to produce electrical signals responsive to the amount of light in said reflected beam and the amount of light scattered by the reflective surface; and
    means for indicating the RMS scattering of said reflected light.

2. The scatterometer of claim 1 wherein said light source is a laser.

3. The scatterometer of claim 1 wherein said light controlling and directing means includes a pin hole and a beam expander.

4. The scatterometer of claim 3 wherein said beam expander is a lens.

5. The scatterometer of claim 1 wherein said light directing means includes positioning means movable transversely over the extent of said planar surface as the surface is moved longitudinally thereunder and effective to transmit said collimated light perpendicular to said planar surface and to scan across said surface.

6. The scatterometer of claim 5 further comprising planar surface translating means effective to move said planar surface laterally with respect to said collimated light beam.

7. The scatterometer of claim 1 wherein said light sensing means includes a second beam splitter effective to direct a portion of said reflected light to a first detector, said first detector being effective to provide a signal representative of the position of the portion of the reflected image generated by incident light normal to the object.

8. The scatterometer of claim 7 wherein the signal generated by the first detector is interconnected with centering means effective to rotate the first beam splitter about is axes and center the signal corresponding to normal incident light.

9. The scatterometer of claim 7 wherein second beam splitter is movable to selectively reflect the light to said first detector.

10. The scatterometer of claim 9 further comprising second detector means positioned at the focal point of the reflected light effective to sense light signals not reflected to said first detector by said second beam splitter.

11. The scatterometer of claim 9 wherein said second beam splitter is a segmented rotating mirror.

12. The scatterometer of claim 10 wherein said second detector means comprises a plurality of concentrically arranged annular detectors.

13. The scatterometer of claim 12 wherein said annular detectors are effective to provide independent signals corresponding to the amount of light incident upon each of said annular detectors.

14. A method for determining surface variations of a planar surface comprising:
producing a monochromatic light beam of selected optical characteristics;
collimating the beam;
directing said beam to said planar surface normal to a portion of said surface, whereby said light is reflected from said surface in a manner indicative of variations in angle of incidence of said collimated light on said surface;
directing said reflected light back along the path of said collimated light to form a focused light beam having a fixed focal distance;
selectively sensing the position of the reflected beam at a first light detector to determine the overall angle of incidence; and
periodically sensing variations in the reflected light that correspond to variations in the angles of incidence other than those indicated by the first detector.

15. The method of claim 14 wherein the light is generated by a laser.

16. The method of claim 14 wherein the light is directed through a pin hole and beam expander prior to collimation.

17. The method of claim 16 wherein said beam expander is a lens.

18. The method of claim 14 further comprising moving said collimated light beam across said planar surface to provide indications of the variations at different points along a first direction on the surface.

19. The method of claim 18 further comprising moving said planar surface laterally in a second direction with respect to said collimated light beam.

20. The method of claim 14 wherein the reflected beam is separated from the produced beam prior to sensing the indications carried therein.

21. The method of claim 20 wherein the separated reflected light is intermittently detected and utilized to provide a signal representative of the main position of the reflected image.

22. The method of claim 21 wherein said signal is used to position the reflected signals for detection.

23. The method of claim 21 wherein the separated reflected light is also detected and utilized to provide signals representative of RMS scattering of the reflected light.

24. The method of claim 23 further comprising detecting the main position of said beam at its focal point and detecting plural signals not at the focal point at discrete distances away from the focal point.

25. The method of claim 24 further comprising calculating root mean square variations from the central focal point of the signals received at discrete distances from the focal point.

* * * * *